March 23, 1943.    F. C. ENDERLE    2,314,328
FLUE OR VENT PIPE
Filed Oct. 28, 1940
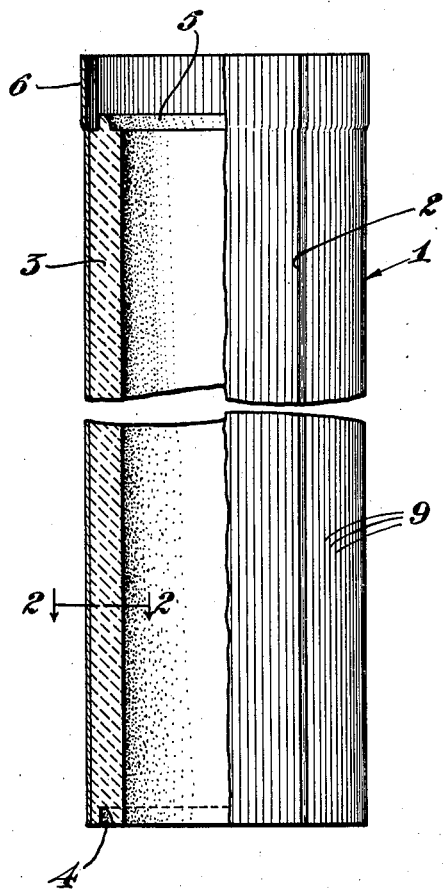
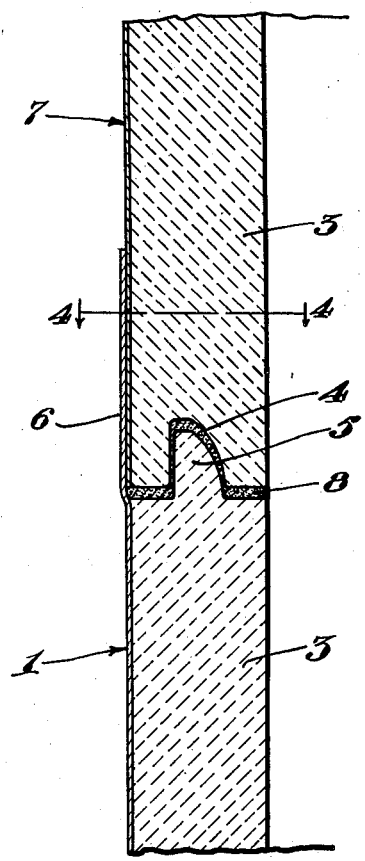
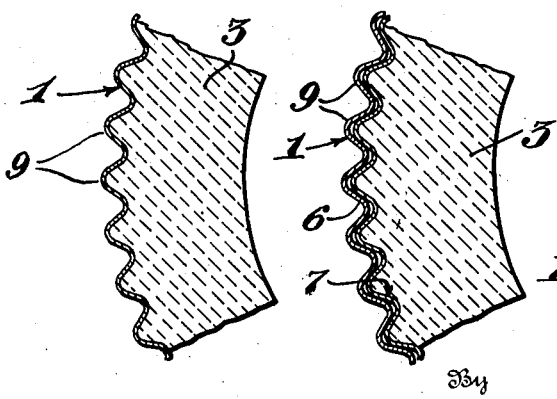
Inventor
Frank C. Enderle
By R. S. Berry
Attorney Patented Mar. 23, 1943

2,314,328

UNITED STATES PATENT OFFICE 2,314,328

FLUE OR VENT PIPE

Frank C. Enderle, Los Angeles, Calif.

Application October 28, 1940, Serial No. 363,117

1 Claim. (Cl. 138—67)

This invention has for its primary object to provide a new form of lined metallic pipe or conduit wherein the lining is made of cementitious or like fire resistant and thermal insulation material; the metallic pipe is constructed to permit of relative expansion and contraction of the pipe and lining without causing a rupture or objectionable distortion of the pipe at its seam or elsewhere, or the cracking of the lining or separation thereof from its molded or cemented-on relation to the interior surfaces of the pipe, and the lined pipe is therefore especially adapted to serve as a flue or vent for stoves, heaters and the like and analagous purposes.

Another object of this invention is to provide a "cement" lined pipe or conduit of the character described wherein the metallic pipe is formed with longitudinal corrugations throughout for permitting of the aforesaid controlled relative expansion and contraction of and also reinforcing the pipe and lining.

A further object of this invention is to provide a "cement" lined pipe of the character described wherein one end is enlarged and forms a bell to accommodate a telescopic joint as used in stove pipes, and the lining arranged to form tongue and groove joints, both in a particularly effective manner.

With the foregoing objects in view, together with such other objects and advantages as may subsequently appear, the invention is carried into effect as illustrated by way of example in the accompanying drawing, in which:

Fig. 1 is a fragmentary, partly elevational, partly sectional view of the pipe embodying my invention;

Fig. 2 is an enlarged fragmentary section taken on the line 2—2 of Fig. 1;

Fig. 3 is an enlarged fragmentary view in section showing a joint of two pipes as made in accordance with my invention;

Fig. 4 is an enlarged fragmentary sectional view taken on the line 4—4 of Fig. 3.

Referring more specifically to the accompanying drawing, one embodiment of my invention includes a sheet metal pipe 1 having a longitudinal seam 2 and provided with a tubular lining 3 formed of cementitious or plastic fire resistant and thermal insulation material such as a cement and asbestos composition. The lining may be embodied in the pipe in contact with the interior surface thereof in any suitable manner as by being molded therein or otherwise, and is considerably thicker than the metallic pipe to afford the desired thermal insulation and fire resisting qualities and to constitute a self sustained cement pipe or flue. Preferably this lining extends from one end of the pipe where it is provided with an annular groove 4, to a point spaced inwardly from the other end of the pipe where it is formed with an annular tongue 5. This leaves an unlined end portion 6 of the pipe which is enlarged or expanded to form a bell for the reception of the smaller end or a similar pipe such as the one 7 indicated in Figs. 3 and 4. This construction facilitates a telescopic joint of the metallic pipe sections, and a tongue and groove joint between the linings as shown in Fig. 3. If desired these linings may be cemented at the joint thereof as at 8.

In view of the fact that the metallic pipe and the lining have widely different co-efficients of expansion I have provided in the pipe 1 a series of closely spaced longitudinal corrugations 9 which preferably extend from one end of the pipe to the other. These corrugations permit of relative expansion and contraction of the pipe and lining while preventing the rupturing of the pipe at its seam or elsewhere, and objectionable distortion of the pipe, as well as the cracking or working loose of the lining, inasmuch as said corrugations tend to straighten out and contract under the stresses of expansion and contraction of the pipe or the liner and these stresses are therefore absorbed without damage to the pipe or lining. Moreover the longitudinal corrugations appreciably strengthen and reinforce the pipe and lining and provide for an effective bonding of the lining to and a supporting thereof in the pipe.

It is important to note that the corrugations define a series of longitudinal ribs interiorly of the pipe which are embedded in the lining to better retain as well as strengthen it yet it is to be understood that the thickness of the lining is such that said lining constitutes a self sustaining cement flue or pipe which is however reinforced and protected by the metallic pipe. The corrugations in the cement liner are of a depth less than the thickness of the liner and therefore are on the exterior only of the liner.

While I have shown and described a specific embodiment of my invention I do not limit myself to the exact details of construction set forth, and the invention embraces such changes, modifications and equivalents of the parts and their formation and arrangement as come within the purview of the appended claim.

I claim:

In a flue or vent pipe, a cement pipe of a thickness to be self sustaining as a flue or pipe in itself and having longitudinal exterior corrugations of a depth less than the thickness of the wall of the pipe and a sheet metal pipe in which said cement pipe is retained and to which said cement pipe is adhered by reason of having been formed therein, said sheet metal pipe being longitudinally corrugated to correspond to and nest with the corrugations in the cement pipe, said cement and sheet metal pipes being substantially flush at certain corresponding ends thereof, the other end of the cement pipe being spaced inwardly from the other end of the sheet metal pipe, there being a circular tongue and a circular groove at ends of said cement pipe with the tongue at the end which is inwardly spaced from the corresponding end of the sheet metal pipe.

FRANK C. ENDERLE.